United States Patent Office 2,876,094
Patented Mar. 3, 1959

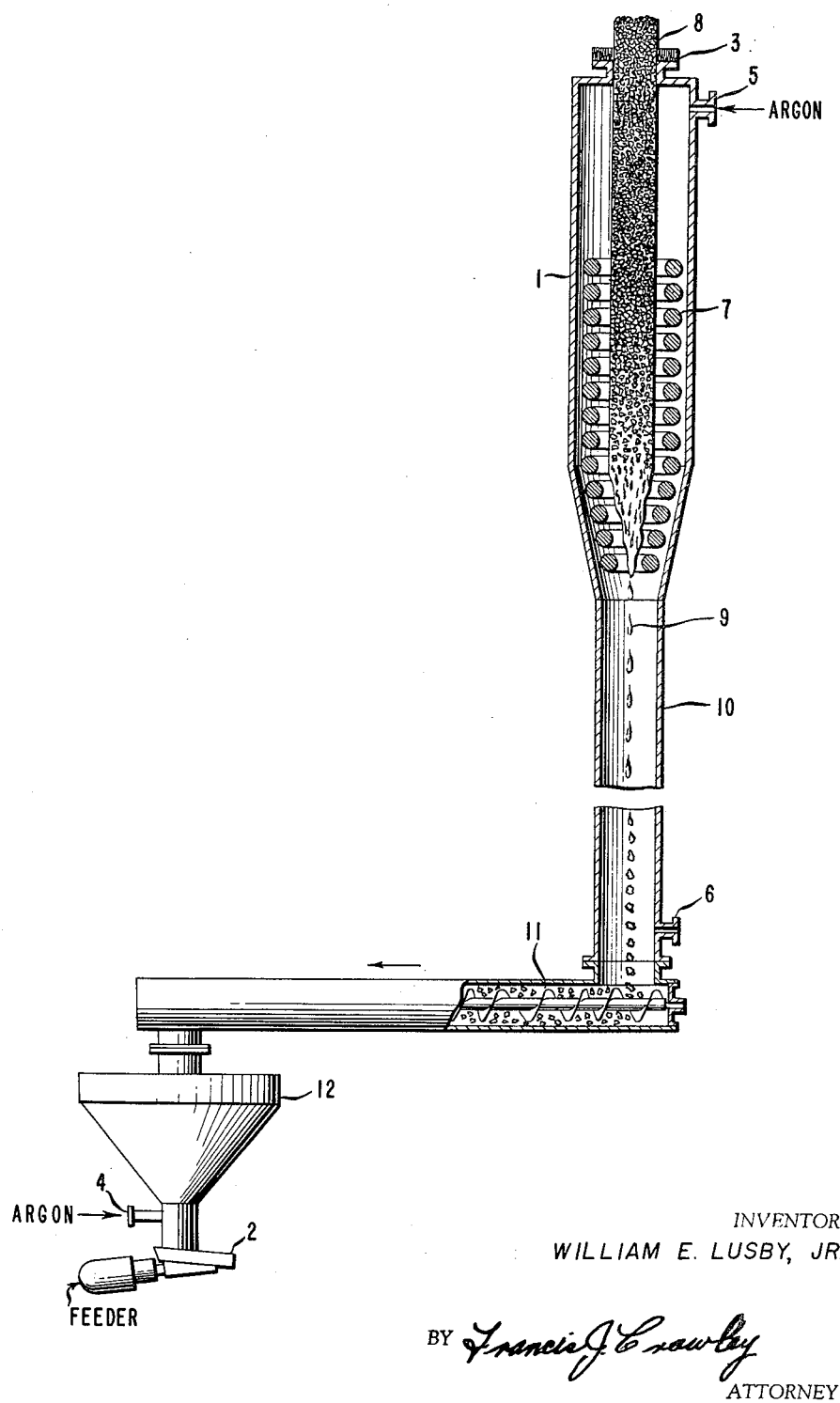

2,876,094
PRODUCTION OF REFRACTORY METALS

William E. Lusby, Jr., Wilmington, Del., assignor to E. I. du Pont de Nemours and Company, Wilmington, Del., a corporation of Delaware Application February 17, 1956, Serial No. 566,142

6 Claims. (Cl. 75—84.4)

This invention pertains to an improvement in the manufacture of pure refractory metals such as titanium, zirconium, vanadium, columbium, chromium and hafnium.

One of the most widely used processes for the production of refractory metals is by the reduction of the metal halide. Various reducing agents have been used with major emphasis being placed on magnesium and sodium metals. In this process, the halide of the reducing metal is formed, and the refractory metal is obtained as a sponge which is essentially an interlocked mass of crystals of fairly small size. The reaction mixture will contain, in addition to the by-product salt or salts, excess reductant metals and various halides of the metal produced. The major portion of these products and by-products can be removed from the refractory metal by conventional separation means, such as decantation, draining or screening. However, it is impossible to completely remove all the undesirable materials in this manner, especially the halide salt of the reducing metal. One of the methods for removing these halide salts is by leaching the sponge metal in an aqueous medium; e. g., a dilute acid solution. This procedure, however, has objectionable limitations. The metal becomes contaminated with oxygen, nitrogen and hydrogen during contact with the aqueous leaching medium, and these impurities cause the metal to become hard and non-ductile.

It has been found that the amount of oxygen, nitrogen and hydrogen contamination encountered in the leaching is adversely influenced by the surface area per unit of mass of the crystals making up the sponge. If the surface area of the sponge is kept at a minimum (e. g., less than about 0.1 square meter per gram for Ti metal) it is possible to use a leaching step and obtain the desired metal in commercial quality. Surface area determinations are discussed by Emmett in "Industrial Engineering Chemistry," vol. 37, p. 639 (1945).

It is an object of this invention to provide a novel process which effects a purification of refractory metal in sponge form and at the same time quickly reduces its specific surface area. It is a further object of this invention to produce refractory metals in a commercially usable form.

These objects are accomplished by passing a pressed rod of refractory sponge metal containing by-product salt, downward into a heating zone wherein the rod is progressively heated and melted. The sponge which makes up the rod is obtained from the reduction of a refractory metal halide, and this sponge product will inherently contain constituents of the reaction mixture which will not separate unless special purification means are resorted to. The temperature of the heating zone is adjusted to cause the lower end of the pressed rod to melt, thereby causing the metal to leave the stick in droplets while the by-products from the reaction are vaporized. These by-products may be withdrawn from the system as a vapor by keeping the temperature along this path of flow above the condensation point, or the temperature may be kept below the condensation point and above the melting point so that the vapor will condense and form a pool beneath the melting rod. The droplets are allowed to fall through an inert cooling atmosphere to a collection zone below; then they are further cooled to a temperature at which said metal particles are non-reactive to the normal atmosphere and recovered. The molten droplets of metal may solidify during their fall or they may be allowed to drop into a pool of molten by-product salts for collection, separation, and recovery. Any recontamination by immersion in the molten salt will be superficial, and easily overcome by washing. The metal particles thus obtained have both a reduced impurity content and a decreased surface area per unit mass, and it is in a commercially usable form.

The following example is a specific embodiment of the invention.

Example 1

Referring to the figure of the accompanying drawing, there is shown a suitable apparatus for carrying out the process of this invention. The system is enclosed by wall 1 constructed of silica or other suitable construction material with gas tight valve 2 and seal 3 near the ends of the system so as to maintain an atmosphere of argon. The gas may be supplied via inlets 4 and 5 at a slight positive pressure (about ½ pound per sq. in. gauge) to prevent inleakage of air and flowed along with the vaporous impurities through outlet 6. This method of supplying and removing the inert gas allows the metal droplets to fall freely; and at the same time, an uncontaminated, cooler gas is in contact with the collected metal. The diameter of the induction coil 7 is about 5", and it is connected to two 50 kw. high frequency oscillators operating at 500 kc. The coupling factor (i. e., the energy transmission from the induction coil to the rod) is about 70%, and the total power input to the high frequency equipment is about 250 kva. The pressed rod 8 of titanium particles is about 4 inches in diameter and it contains about 85% metal on a volumetric basis, the rest being impurities of the reduction reaction. The rod was passed downwardly through the coil at a rate of about 3 inches per minute. The coil tapers towards its lower end, and when the field is applied, the end of the rod is melted to a point. This configuration controls the fall of the metal. During operation the sidewalls 1 are kept at about 900° C. by conventional heating means and radiation from the rod. The droplets 9 that are released from the stick fall through the cooling tower 10, which is 14' high and 6" in diameter, to a water cooled conveyor 11, and in turn to hopper 12. Metal particles obtained are suitable for melting and casting, and the above described apparatus is capable of treating up to 5 pounds of titanium per minute.

When it is desired to obtain as pure a product as possible, the recovered metal should be washed with an aqueous medium, such as water, or a dilute acid, e. g., a 5% nitric acid which will remove any soluble impurities. An aqueous acid medium is preferred since certain residual salts can be hydrolyzed by water forming insoluble oxides. Because the surface area of the metal per unit mass has been reduced below the critical value for contacting with aqueous media without undesirable contamination, such washing is easily accomplished. Furthermore, the treated metal is obtained as dense spherical particles substantially free of pores and surface cavities which entrap residual salts and make their removal by water difficult. Any impurities which are to be removed are on the surface where they may be quickly washed off.

While the specific embodiment has shown the use of argon with the by-product salt vapors as the inert atmosphere, it should be understood that other non-reactive vapors such as helium, krypton, or the by-product salts alone may be used to shield the metal from the normal atmosphere. The maintenance of a shielding atmosphere in refractory metal production is well-known, and a suitable gas can be selected by one skilled in the art. Reduced pressure may be used in the process, provided that the system is adequately sealed to prevent inleakage of air.

The temperature at which the metal particles can be removed from the inert atmosphere will vary with the metal being treated, the impurities present, the specific surface area of the metal, and the particle size of said metal. It is preferred to reduce the temperature of the metal particles to atmospheric temperature before removing them from the inert atmosphere. This is especially true when the treated metal contains fines. However, the metal may be removed at higher temperatures if one first determines the maximum temperature for non-reactivity under the particular operating conditions.

Variations of the heating energy input, the rate of feed of the rod and the particle size to obtain the desired purity and surface area can be determined by one skilled in the art. It is more economical to use a heating means which will raise the temperature of the end of the metal rod to the melting point in the shortest possible time. One method of supplying the heating energy is a field developed by an induction coil using frequencies from 100 kc. to 5 mc. A preferred frequency range is from 450 to 530 kc. The necessary power will range from 2–3 kw. per square inch of rod surface, but the amount of power will increase when smaller particles are used. The salt and other impurity content of the titanium rod may vary considerably without any significant effects. The usual rod will contain from 60 to 95% metal on a volumetric basis. The heating of the sidewalls of the apparatus is preferred because it will prevent condensation of salt vapors thereon, and wall temperatures of between 700° and 900° C. will accomplish this purpose. The heated walls will also make it easier to melt the rod in the high frequency field since the temperature rise will not be as great. However, the operation can be carried out without resorting to such heating.

The drawing shows the coil inside the system, but it is also possible to have coil on the outside of the silica tube. In this latter embodiment, the energy transfer efficiency will not be as great, but other advantages, such as eliminating contact of coil materials with salt vapor, can be obtained. It should also be pointed out that embodiments of my invention offer a choice of construction materials for enclosing the system. Besides silica, zirconia, mullite, and titanium nitride might be suitable for this purpose where a nonconducting container is required.

Also contemplated as suitable electrical heating means are arcs, single or multiple, established at the melting end of the sponge rod. One or more of the electrodes for establishing the arc or arcs could be consumable electrodes of the spronge rod to be melted. The arc can be between the tips of two or more similar sponge rods, between a large central rod and several smaller rods surrounding the rod tip, or between the melting rod tip and a cooled non-contaminating electrode of another material. The electrical energy supplied to the arc may be alternating or direct current with alternating current being preferred when using consumable electrodes because of the more favorable economic benefits. The presence of the inert gas in the system tends to stabilize the arc as well as aiding in removal of by-product salts.

Another heating means within the scope of my invention utilizes the radiant energy from an electrically heated source positioned around the lower end and the melting tip of the rod. This radiant source may be electrically heated graphite, or electrically heated, non-contaminating refractory metal having a melting point higher than the metal being treated, such as molybdenum or tungsten. The electrical heating of this radiation source may be done by inductive or conductive means. The radiant source of heat may be shaped in the same manner as the induction coil shown in the figure to aid in maintaining the proper shape of the melting rod tip. Metal apparatus may be used when it is not required to inductively couple through the enclosing walls.

Titanium, zirconium, vanadium, columbium, chromium, and hafnium have been mentioned as metals which may be treated by the process of this invention. However, other refractory metals of groups IV, V and VI may be treated in the same manner.

One of the advantages of this invention is the high rate of energy transfer per unit volume sponge. It is possible for example, to apply on the order of 50–100 kw. of power into a small receptor volume. Metal sponge placed in a heating field of this intensity will be heated to the melting point within a short time thus resulting in a very high speed process utilizing small simple equipment to purify and reduce the specific surface area of refractory metal sponge. Another advantage is that this metal is not in contact with any portion of the equipment when it is at maximum temperature thereby minimizing the tendency for contamination of the refractory metal by the materials of the apparatus.

I claim:
1. A process for purifying a refractory sponge metal obtained from the reduction of the metal halide with a reducing metal and containing as impurities unreacted reactants and by-products from the reduction reaction entrapped in the pores of said sponge, said process comprising conducting the following steps in a system containing an atmosphere of a shielding gas, passing downwardly through an electrically heated melting zone a rod composed of said metal and impurities from the reduction reaction, said impurities having a boiling point below the melting point of the metal, melting the end of said rod in said zone out of contact with contaminating equipment thereby causing droplets of metal to fall from said rod and vaporization and expulsion of the impurities contaminating said metal, withdrawing vaporized impurities from the melting zone while allowing the metal droplets to free-fall through a cooling space to a collection zone below where dense, substantially spherical particles are obtained, further cooling the collected metal particles to a temperature at which said particles are non-reactive with the normal atmosphere, recovering purified metal particles with a reduced surface area from said system, and then washing said particles with an aqueous medium to remove residual impurities from the surface of the particles.

2. The process of claim 1 in which the refractory metal is titanium.

3. A process for purifying a refractory metal sponge obtained from the reduction of the metal halide with a reducing metal and containing as impurities unreacted reactants and by-products from the reduction reaction entrapped in the pores of said sponge, said process comprising conducting the following steps in a system containing an atmosphere of a shielding gas, passing downwardly through an electrically heated melting zone a rod composed of said metal and impurities from the reduction reaction, said impurities having a boiling point below the melting point of the metal, melting the end of said rod in said zone out of contact with contaminating equipment by passing electrical current through said rod and establishing an arc between the melting end of said rod and another electrode rod thereby causing droplets of metal to fall from said rod and vaporization and expulsion of the impurities contaminating said metal, withdrawing vaporized impurities from the melting zone while allowing the metal droplets to free-fall through a cooling space to a collection zone below where dense, substantially spherical particles are obtained, further cooling the collected metal particles to a temperature at which said particles are non-reactive with the normal atmosphere, recovering purified metal particles with a reduced surface area from said system, and then washing said particles with an aqueous medium to remove residual impurities from the surface of the particles.

4. The process of claim 3 in which the refractory metal is titanium.

5. A process for purifying a refractory metal sponge obtained from the reduction of the metal halide with a reducing metal and containing as impurities unreacted reactants and by-products from the reduction reaction entrapped in the pores of said sponge, said process comprising conducting the following steps in a system containing an atmosphere of a shielding gas, passing downwardly through an electrically heated melting zone a rod composed of said metal and impurities from the reduction reaction, said impurities having a boiling point below the melting point of the metal, melting the end of said rod in said zone out of contact with contaminating equipment by application of heating energy from an electrically heated radiant energy source positioned around the melting zone thereby causing droplets of metal to fall from said rod and vaporization and expulsion of the impurities contaminating said metal, withdrawing vaporized impurities from the melting zone while allowing the metal droplets to free-fall through a cooling space to a collection zone below where dense, substantially spherical particles are obtained, further cooling the collected metal particles to a temperature at which said particles are non-reactive with the normal atmosphere, recovering purified metal particles with a reduced surface area from said system, and then washing said particles with an aqueous medium to remove residual impurities from the surface of the particles.

6. The process of claim 5 in which the refractory metal is titanium.

References Cited in the file of this patent

UNITED STATES PATENTS

| | | |
|---|---|---|
| 2,595,780 | Dunlap | May 6, 1952 |
| 2,686,864 | Wroughton et al. | Aug. 17, 1954 |
| 2,688,169 | Gruber et al. | Sept. 7, 1954 |
| 2,734,244 | Herres | Feb. 14, 1956 |
| 2,762,856 | Newcomb et al. | Sept. 11, 1956 |
| 2,778,726 | Winter et al. | Jan. 22, 1957 |

FOREIGN PATENTS

| | | |
|---|---|---|
| 1,088,006 | France | Sept. 1, 1954 |